(12) United States Patent
Wadden et al.

(10) Patent No.: US 11,055,257 B2
(45) Date of Patent: Jul. 6, 2021

(54) SYSTEMS AND METHODS FOR DISJOINT CHARACTER SET REPORT MERGING

(71) Applicant: UNIVERSITY OF VIRGINIA PATENT FOUNDATION, Charlottesville, VA (US)

(72) Inventors: John Pierson Wadden, Charlottesville, VA (US); Kevin Alan Angstadt, Madrid, NY (US)

(73) Assignee: University of Virginia Patent Foundation, Charlottesville, VA (US)

( * ) Notice: Subject to any disclaimer, the term of this patent is extended or adjusted under 35 U.S.C. 154(b) by 931 days.

(21) Appl. No.: 15/590,492

(22) Filed: May 9, 2017

(65) Prior Publication Data
US 2018/0330014 A1 Nov. 15, 2018

(51) Int. Cl.
*G06F 15/80* (2006.01)
*G06F 15/78* (2006.01)
*G06F 15/76* (2006.01)

(52) U.S. Cl.
CPC ......... *G06F 15/7867* (2013.01); *G06F 15/76* (2013.01); *G06F 15/80* (2013.01)

(58) Field of Classification Search
CPC ...... G06F 15/76; G06F 15/7867; G06F 15/80; G06F 8/31; G06F 9/4498
See application file for complete search history.

(56) References Cited

U.S. PATENT DOCUMENTS

| 10,580,481 | B1* | 3/2020 | Sadredini | G11C 11/406 |
| 2017/0097852 | A1* | 4/2017 | Glendenning | G06F 9/4498 |
| 2018/0330014 | A1* | 11/2018 | Wadden | G06F 15/76 |

OTHER PUBLICATIONS

Roy et al., "Algorithmic Techniques for Solving Graph Problems on the Automata Processor", 2016, IEEE International Parallel and Distributed Processing Symposium, pp. 283-292 (Year: 2016).*
Wadden et al., "Automata-to-Routing: An Open-Source Toolchain for Design-Space Exploration of Spatial Automata Processing Architectures", May 2, 2017, 2017 IEEE 25th International Symposium of Field-Programmable Custom Computing Machines, pp. 180-187 (Year: 2017).*
Zhou et al., "Brill Tagging on the Micron Automata Processor", 2015, IEEE ICSC 2015, pp. 236-239 (Year: 2015).*

* cited by examiner

*Primary Examiner* — Paulinho E Smith
(74) *Attorney, Agent, or Firm* — Finnegan, Henderson, Farabow, Garrett & Dunner LLP (57) ABSTRACT

The present disclosure relates to systems and methods for automatically optimizing a reporting architecture of an application. In one implementation, a system for automatically optimizing a reporting architecture of an application may include a memory storing instructions and an automata processor configured to execute the instructions. The instructions may include identifying one or more state transition elements in the application; determining if two or more state transition elements have disjoint character sets; grouping two or more state transition elements having disjoint character sets into one or more groups; merging state transition elements included in the one or more groups; and outputting a merged report configured for disambiguation on a second processor.

11 Claims, 5 Drawing Sheets

SYSTEMS AND METHODS FOR DISJOINT CHARACTER SET REPORT MERGING

This invention was made with government support under Grant No. HR001-13-3-0002 awarded by the Department of Defense/Defense Advanced Research Projects Agency (DARPA). The government has certain rights in the invention.

TECHNICAL FIELD

This disclosure relates generally to automata processors. More specifically, and without limitation, this disclosure relates to systems and methods for automatically optimizing a reporting architecture of an application for an automata processor.

BACKGROUND

Automata processing—that is, execution of a task graph on a string of global input signals—permits computation to be performed using a set of states and transition rules or functions. Automata processing offers significant advantages over the widely-used object-oriented programming. In particular, automata processing is more adapted for parallelism in general and toward solving problems similar to Markov algorithms in specific.

Furthermore, automata processing offers performance potential beyond traditional von Neumann architecture. Traditional von Neumann architecture suffers from a bottleneck because the instruction storage and data storage share a common bus. Multithreading and multiprocessing, while increasing the computing speed of the Central Processing Unit (CPU), also worsen this bottleneck, which prevents full performance gains from being realized.

Some automata processors are gaining in commercial popularity. For example, Micron's Automata Processor consists of a reconfigurable fabric of automata processing elements implemented in a dynamic random-access memory process. Each element is then laid out spatially on the reconfigurable fabric rather than temporally, as in traditional von Neumann architecture. Field-programmable gate arrays (FPGAs) also may be configured to function as an automata processor.

Nevertheless, automata processors still contain performance bottlenecks for certain applications. For example, the reporting architecture or driver overhead of the automata processor may degrade optimal performance. Accordingly, there is a need for optimization techniques that allow more of the potential performance gain of automata processors to be realized.

SUMMARY

At present, spatial reconfigurable automata processors have a reporting architecture that functions as a performance bottleneck for applications that report frequently. The disclosed systems and methods merge disjoint character reporting elements in an application, thereby optimizing the performance of the application on the reporting architecture. Thus, if an application for an automata processor is optimized according to the embodiments of the present disclosure, the application may exhibit increased performance as compared to the non-optimized application. In addition, one or more optimized reporting methods implemented by the disclosed systems and methods could be implemented directly in the application when the application is first developed.

Certain embodiments of the present disclosure relate to systems and methods for automatically optimizing a reporting architecture of an application for an automata processor. Advantageously, this optimization may overcome a bottleneck unique to spatial reconfigurable automata processors and may allow for larger efficiency gains over von Neumann architecture to be realized.

According to an exemplary embodiment of the present disclosure, a system for automatically optimizing automata graphs for applications on spatial reconfigurable automata processors is described. The system may include a memory storing instructions and an automata processor configured to execute the instructions. The instructions may include identifying one or more state transition elements in the application. State transition elements (STEs) may compute a matching rule and broadcast the Boolean result to child elements. The instructions may further include determining if two or more state transition elements have disjoint character sets. For example, disjoint character sets may have no elements in either character set in common. The instructions may further include grouping two or more state transition elements having disjoint character sets into one or more groups. The instructions may further include merging state transition elements included in one or more groups. For example, merging state transition elements may include any technique for considering reporting elements identical, such as wiring their output to the same port, installing OR gates configured to merge reports from one or more groups of STEs, installing child STEs configured to merge reports from one or more parent STEs, etc. Herein, "OR" gates refer to logic gates that return true when at least one Boolean input of a plurality of Boolean inputs is true. Logic gates may be physically installed within the automata processor (e.g., with additional circuits) or programmed within the automata processor (e.g., by adjusting the reconfigurable fabric). The instructions may further include outputting a merged report configured for disambiguation on a second processor.

According to a further exemplary embodiment of the present disclosure, a method for automatically optimizing automata graphs for applications on a spatial reconfigurable automata processor is described. The method may include identifying one or more state transition elements in the application. State transition elements (STEs) may compute a matching rule and broadcast the Boolean result to child elements. The method may further include determining if two or more STEs have disjoint character sets. For example, disjoint character sets may have no elements in their respective character sets in common. The method may further include grouping two or more STEs having disjoint character sets into one or more groups. The method may further include merging STEs included in one or more groups. For example, merging STEs may include any technique for considering reporting elements identical, such as wiring their output to the same port, installing OR gates configured to merge reports from one or more groups of STEs, installing child STEs configured to merge reports from one or more parent STEs, etc. The method may further include outputting a merged report configured for disambiguation on a second processor.

According to a further exemplary embodiment of the present disclosure, a method for automatically reporting disjoint character sets in an application is described. The method may include determining if a group of STEs in the application having disjoint character sets has been activated by a triggering input. STEs may compute a matching rule and broadcast the Boolean result to child elements. When the Boolean result is true (i.e., 1), the STE may be described as activated, and any child elements of the STE may also be described as enabled. STEs with disjoint character sets may compute matching rules based on character sets with no element in common. The method may further include receiving the triggering input. The method may further include determining which set of the disjoint character sets matches the triggering input. For example, the triggering input may indicate which STE in the group of STEs was activated. The method may further include disambiguating the report based on the set matching the triggering input.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DETAILED DESCRIPTION

The disclosed embodiments relate to systems and methods for automatically optimizing a reporting architecture of an application for an automata processor. Embodiments of the present disclosure may be implemented in a commercial automata processor, e.g., FPGAs or Micron's Automata Processor, or may be implemented in a comparable processor capable of executing non-deterministic finite automata (NFA).

Advantageously, embodiments of the present disclosure may allow for increasing the reporting efficiency of an application designed for running on an automata processor. Additionally, embodiments of the present disclosure may allow for greater realization of the potential efficiency gains of automata processors over typical von Neumann architecture.

According to an aspect of the present disclosure, an automata processor may receive an application. The application may be written in a general computing language, for example, Verilog or VHDL. The application may further use a processor-specific software development kit (SDK). In other embodiments, the automata processor may include the application as a circuit within the processor. In such embodiments, the automata processor may include an application-specific integrated circuit (ASIC) or other integrated circuit(s) (IC(s)) programmable with one or more hardware description languages (HDLs), such as Verilog or VHDL.

In some embodiments, the application may represent one or more non-deterministic finite automata (NFA). An NFA may, for example, be represented formally by a 5-tuple (Q, $\Sigma$, $\Delta$, $q_0$, F). The 5-tuple may consist of:

a finite set of states Q
a finite set of input symbols $\Sigma$
a transition function $\Delta$: $Q \times \Sigma \rightarrow P(Q)$
an initial (or start) state $q_0 \in Q$
a set of states F distinguished as accepting (or final) states $F \subseteq Q$.

In certain aspects, the one or more NFA may include one or more deterministic finite automata (DFA). A DFA may, for example, be represented formally by 5-tuple, (Q, $\Sigma$, $\delta$, $q_0$, F). The 5-tuple may consist of:

a finite set of states Q
a finite set of input symbols (sometimes called the alphabet) $\Sigma$
a transition function $\delta$: $Q \times \Sigma \rightarrow Q$
an initial (or start) state $q_0 \in Q$
a set of accept (or final) states $F \subseteq Q$.

DFA are a subset of NFA in that the non-deterministic transition functions of NFA may be converted into one or more deterministic transition functions of DFA using powerset construction. Because powerset construction requires determining the reachable subset of all states within an n-state NFA, a DFA produced by powerset construction may have, at most, $2^n$ states. Therefore, the performance of a DFA may be exponentially worse than a corresponding NFA. Advantageously, automata processors may be adapted to execute NFA without converting to DFA and therefore may realize potentially exponential performance gains over DFA processors (e.g., traditional von Neumann architecture).

In some embodiments, the automata processor may include and/or have an operable connection with at least one memory. For example, the at least one memory may include dynamic random-access memory. The memory may store the application to be executed on the automata processor. Furthermore, the memory may store additional methods, including the optimization methods disclosed below.

In some embodiments, the automata processor may include and/or have an operable connection with at least one PCI Express (PCIe) bus. Advantageously, a PCIe bus may allow the automata processor to have an operable connection with a general-purpose computer, e.g., a conventional server.

According to an aspect of the present disclosure, the automata processor may identify one or more state transition elements (STEs) in the application. An STE may store a character set that may represent all possible input symbols the STE matches against. In addition, an STE may examine a global input symbol and define a Boolean activation function as whether or not the global input symbol is contained in the character set. Generally, an STE may be described as "activated" when its match rule is satisfied. Herein, the term "match rule" may refer to a Boolean match operation like perfect match operator (e.g., two strings perfectly match when both strings have equivalent characters in equivalent locations) or an inclusive match operator (e.g., two strings match if one is a subset of the other). In addition, the term "match rule" may refer to the Boolean output of whether a similarity threshold is met; for example, the similarity between two strings may be quantified using one or more known algorithms like Damerau-Levenshtein distance or Jaccard index. For example, an STE may be configured to report on activation and thereby produce a 1-bit output.

According to an aspect of the present disclosure, the automata processor determines if two or more of the identified STEs have disjoint character sets. For example, two characters sets may be disjoint when the sets have no common members—e.g., the character set "EQ1095" and the character set "TP3682" are disjoint while the character set "FP901" and the character set "GP239" are not disjoint on account of 'P' and '9' being common to both sets.

According to an aspect of the present disclosure, the automata processor may group two or more of the STEs determined to have disjoint character sets into one or more groups. For example, the automata processor may determine that a first STE, a second STE, and a third STE have disjoint character sets and group them into group A and may further determine that a fourth STE and a fifth STE have disjoint character sets and group them into group B. By way of further example, a first STE may have character set "EQ1095" and a second STE may have character set "TP3682" and the automata processor may place these two STEs in a first group; similarly, a third STE may have character set "FP901" and a fourth STE may have character set "GE234" and the automata processor may place these two STEs in a second group. The automata processor will not create a group containing the first STE with either the third STE or the fourth STE since they are not disjoint, and the automata processor will not create a group containing the second STE with either the third STE or the fourth STE since they are also not disjoint.

According to an aspect of the present disclosure, the automata processor may merge STEs included in the one or more groups. In some embodiments, merging may include any method to consider the reporting signals of all STEs in the group identical, such as installing OR gates configured to merge reports from the STEs included in the one or more groups. For example, in a group containing a first STE with a first character set and a second STE with a second character set, the OR gate will combine the Boolean outputs of the first STE and the second STE to generate a joint report. By way of further example, if a global input contained "GE234" and if a group contained a first STE having character set "Q1095" and a second STE having character set "GE234" then the OR gate may combine the output of 0 (false) from the first STE with the output of 1 (true) from the second STE to generate a merged output of 1 (true).

In other embodiments, merging may include adding one or more STEs. In such embodiments, the one or more STEs may be children of the one or more groups and may be configured to merge reports from the one or more parents. Preferably, the one or more child STEs are further configured to report every cycle and to disambiguate the report generated by the one or more parents. For example, in a group containing a first STE with a first character set and a second STE with a second character set, the child STE will activate if either the first STE or the second STE is activated and will consider the global input against both the first character set and the second character set. By way of further example, if a global input contained "GE234" and if a group contained a first STE having character set "Q1095" and a second STE having character set "GE234" then the group would activate and the child STE would compare the global input ("GE234") against the first character set ("Q1095") and the second character set ("GE234") in order to disambiguate which parent STE in the group caused the child STE to activate.

According to an aspect of the present disclosure, the automata processor may output a merged report configured for disambiguation on a second processor. For example, the report may include the merged Boolean output and the global input such that the second processor may determine which STE in the group caused the activation. In some embodiments, the second processor may comprise a traditional von Neumann architecture.

By way of further example, if a global input contained "GE234" and if a group contained a first STE having character set "Q1095" and a second STE having character set "GE234" then the OR gate would output 1 (true) and the second processor would compare the global input ("GE234") against the first character set ("Q1095") and the second character set ("GE234") in order to disambiguate which parent STE in the group caused the OR gate to output 1 (true).

According to another embodiment of the present disclosure, an application designed for execution by an automata processor may include a method for automatically reporting disjoint character sets. In some aspects, the method may include determining if a group of state transition elements (STEs) in the application having disjoint character sets has been activated by a triggering input. STEs may compute the result of applying a matching rule to a global input and broadcast the Boolean result to child elements. An STE may be described as activated when the Boolean result is true (i.e., 1), and any child elements of the STE may also be described as enabled. STEs with disjoint character sets compute matching rules based on character sets that have no element in common.

According to an aspect of the present disclosure, the method may further include receiving a triggering input. The triggering input may be the global input because an STE generally compares the global input against the character set of the STE.

According to an aspect of the present disclosure, the method may further include determining which set of the disjoint character sets matches the triggering input. For example, the triggering input may be the global input and may indicate which STE in the group of STEs was activated. By way of further example, if the global input contained "GE234" and if the group contained a first STE having character set "Q1095" and a second STE having character set "GE234" then the group would activate and the global input ("GE234") would be compared to the first character set ("Q1095") and the second character set ("GE234") in order to determine which character set matches the triggering input.

According to an aspect of the present disclosure, the method may further include disambiguating the report based on the set matching the triggering input. For example, if the triggering input contained "GE234" and was compared to a first character set "Q1095" and a second character set "GE234," then a report generated by a group having a first STE with character set "Q1095" and a second STE with character set "GE234" could be disambiguated.

Reference will now be made in detail to exemplary embodiments and aspects of the present disclosure, examples of which are illustrated in the accompanying drawings.

Figure 1:
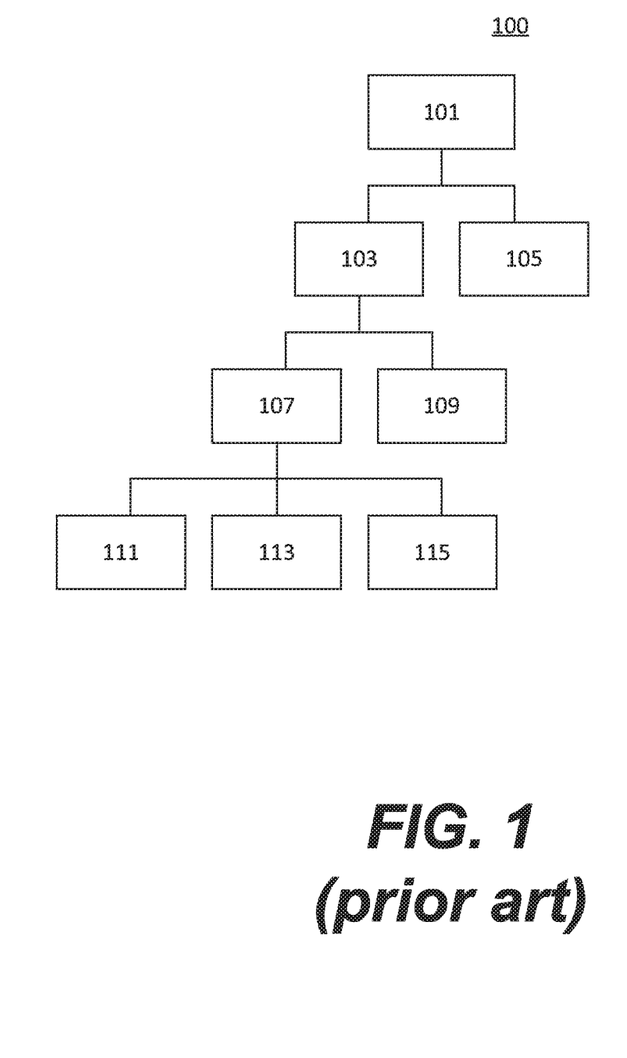
FIG. 1 (prior art) is a depiction of an exemplary class hierarchy of functions for an automata processor.

FIG. 1 is a depiction of an exemplary class hierarchy 100 of functions for an automata processor. Hierarchy 100 is well-known in the art. As depicted in FIG. 1, hierarchy 100 may be a hierarchy of elements 101.

As further depicted in FIG. 1, elements 101 may comprise special elements 103 and state transition elements (STEs) 105. STEs 105 may compute the result of applying a matching rule to a global input and broadcast the Boolean result to child elements. Special elements 103 may include all elements that compute results based on activation symbols rather than the global input.

As further depicted in FIG. 1, special elements 103 may comprise gates 107 and counters 109. Counters 109 may store a number and increment said number whenever one or more parent elements are activated. Counters 109 may further activate when said number reaches a threshold. Gates 107 may include logic gates such as NOT (shown as 115), AND (shown as 111), OR (shown as 113), XOR (not shown), NAND (not shown), NOR (not shown), or XNOR (not shown). Gates 107 may further include compound logic gates (not shown), such as AND-OR-Invert (AOI) or OR-AND-Invert (OAI).

Figure 2:
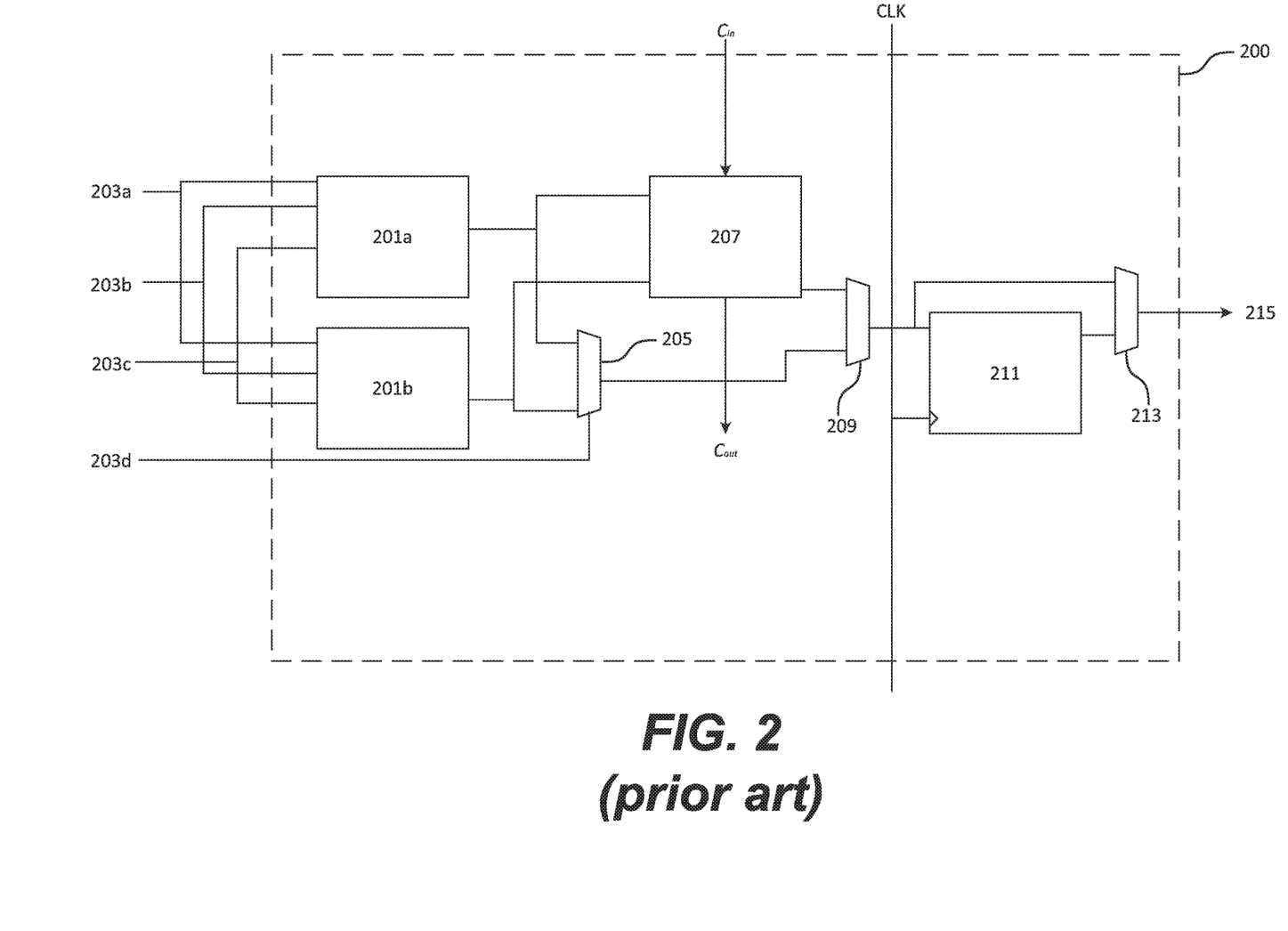
FIG. 2 (prior art) is a depiction of an exemplary logic cell for use in an automata processor built using field-programmable gate arrays (FPGAs).

FIG. 2 is a depiction of an exemplary logic cell 200 for use in an automata processor built using field-programmable gate arrays (FPGAs). Logic cell 200 is well-known in the art and may comprise a logic block in combination. (An array of logic blocks may comprise an FPGA.)

As depicted in FIG. 2, logic cell 200 may include two 3-input lookup tables (LUTs)—for example, 3-input LUTs 201a and 201b. Inputs 203a, 203b, and 203c may each be input into LUT 201a and LUT 201b. Input 203d may be input into multiplexer 205. The outputs of LUT 201a and LUT 201b may also be input in multiplexer 205.

As further depicted in FIG. 2, logic cell 200 may also include full adder 207. Full adder 207 may receive the outputs of LUT 201a and LUT 201b as input and may also accept carry-in $C_{in}$ and carry-out $C_{out}$. The output of full adder 207 and the output of multiplexer 205 may be input into multiplexer 209.

As further depicted in FIG. 2, the output of multiplexer 209 may be input into D-type flip-flop 211. Clock signal CLK may synchronize flip-flop 211. The output of multiplexer 209 and the output of flip-flop 211 may be input into multiplexer 213. Output 215 may comprise the output of multiplexer 213.

One skilled in the art may modify logic cell 200 and/or bundle one or more logic cells together to form a logic block. Moreover, one skilled in the art may form an array from a plurality of logic blocks. An FPGA may comprise a plurality of logic blocks, but one skilled in the art may add additional components such as one or more transceivers, one or more processor cores, one or more Ethernet MACs, one or more PCI/PCI Express controllers, or one or more external memory controllers.

Figure 3:
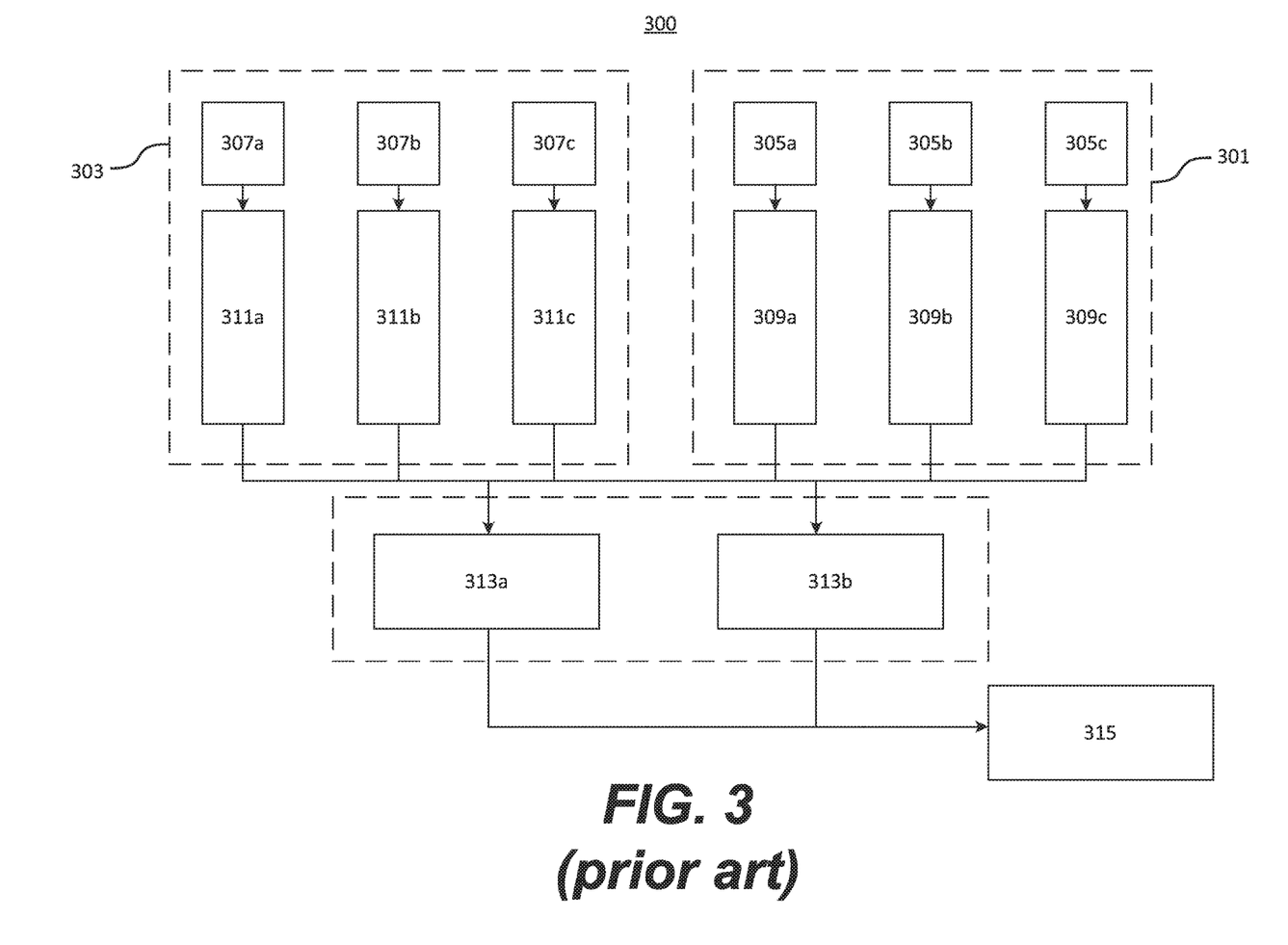
FIG. 3 (prior art) is a depiction of an exemplary reporting architecture for an automata processor.

FIG. 3 is a depiction of an exemplary reporting architecture 300 for an automata processor. Architecture 300 is well-known in the art. For example, architecture 300 may be included in commercial automata processors such as Micron's Automata Processor.

As depicted in FIG. 3, architecture 300 may include two half-cores—for example, half-cores 301 and 303. Half-cores 301 and 303 may each include three reporting regions—for example, half-core 301 includes reporting regions 305a, 305b, and 305c, and half-core 303 includes reporting regions 307a, 307b, and 307c. Each reporting region may include one or more elements of an application. For example, in Micron's Automata Processor, each reporting region may include up to 1,024 different elements each outputting a single-bit report and may record the single-bit reports into a single-cycle report vector.

As further depicted in FIG. 3, each reporting region may have a corresponding first-level storage buffer—for example, region 305a has buffer 309a, region 305b has buffer 309b, region 305c has buffer 309c, region 307a has buffer 311a, region 307b has buffer 311b, and region 307c has buffer 311c. For example, in Micron's Automata Processor, each first-level storage buffer may store up to 1,024 reporting vectors.

As further depicted in FIG. 3, the first-level storage buffers may export to one or more second-level storage buffers—for example, first-level buffers 309a, 309b, 309c, 311a, 311b, and 311c export to second-level buffers 313a and 313b. Preferably, buffers 313a and 313b may form a double-buffered structure—for example, if second-level buffer 313a is exporting, first-level buffers 309a, 309b, 309c, 311a, 311b, and 311c may continue to export to second-level buffer 313b.

As depicted in FIG. 3, second-level buffers 313a and 313b may export to external memory interface 315. For example, interface 315 may comprise a DDR3 memory interface. One skilled in the art may modify architecture 300 to include additional buffers, additional memory interfaces, etc.

Figure 4:
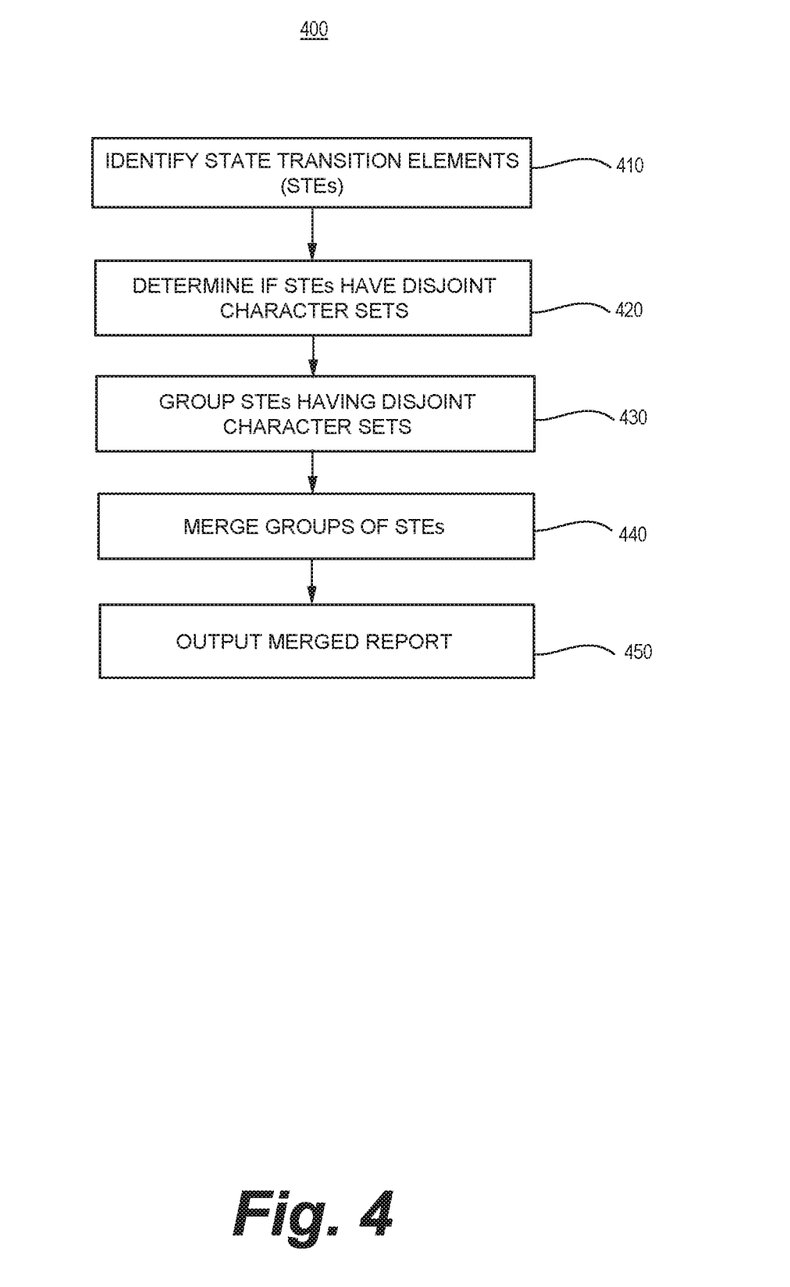
FIG. 4 is a flowchart of an exemplary method for automatically optimizing a reporting architecture of an application for an automata processor.

FIG. 4 is a flowchart of an exemplary method 400 for automatically optimizing a reporting architecture of an application for an automata processor. Method 400 may be implemented using an automata processor. Alternatively, a general purpose or special-purpose computer using von Neumann architecture may be used to implement method 400.

At step 410, the automata processor may identify one or more state transition elements (STEs) in the application. For example, each STE may store a character set that represents all possible input symbols the STE matches against and may define a Boolean activation function as whether or not a global input symbol is contained in the character set.

At step 420, the automata processor may determine if two or more of the identified STEs have disjoint character sets. For example, two character sets may be disjoint when the sets have no common members—e.g., the character set "FT90" and the character set "GH1234" are disjoint while the character set "FT90" and the character set "GH9876" are not disjoint on account of '9' being common to both sets.

At step 430, the automata processor may group two or more of the STEs determined to have disjoint character sets into one or more groups. For example, if the automata processor identifies a first STE having character set "FT90"; a second STE having character set "GH1234"; a third STE having character set "ZP5678"; and a fourth STE having character set "KG9876" then the automata processor may determine that the first, second, and third STE have disjoint character sets and group these three STEs together. In the same example, the automata processor may determine that the fourth STE is not disjoint with the first STE, the second STE, or the third STE and thus may not include the fourth STE in the group.

At step 440, the automata processor may merge the STEs included in the one or more groups. In some embodiments, merging may include wiring the outputs of each STE to the same output report port, or explicitly installing OR gates configured to merge reports from the STEs included in the one or more groups. For example, if a global input contained "GH1234" and if a group contained a first STE having character set "FT90" and a second STE having character set "GH1234" then the OR gate may combine the output of 0

(false) from the first STE with the output of 1 (true) from the second STE to generate a merged output of 1 (true).

In other embodiments, merging may include adding one or more STEs. For example, the one or more STEs may be children of the one or more groups and may be configured to merge reports from the one or more parents.

At step 450, the automata processor may output a merged report configured for disambiguation on a second processor. For example, the report may include the merged Boolean output and the global input such that the second processor may determine which STE in the group caused the activation. In some embodiments, the second processor may comprise a traditional von Neumann architecture.

For example, if a global input contained "GH1234" and if a group contained a first STE having character set "FT90" and a second STE having character set "GH1234" then the OR gate would output 1 (true) and the second processor would compare the global input ("GH1234") against the first character set ("FT90") and the second character set ("GH1234") in order to disambiguate which parent STE in the group caused the OR gate to output 1 (true).

Figure 5:
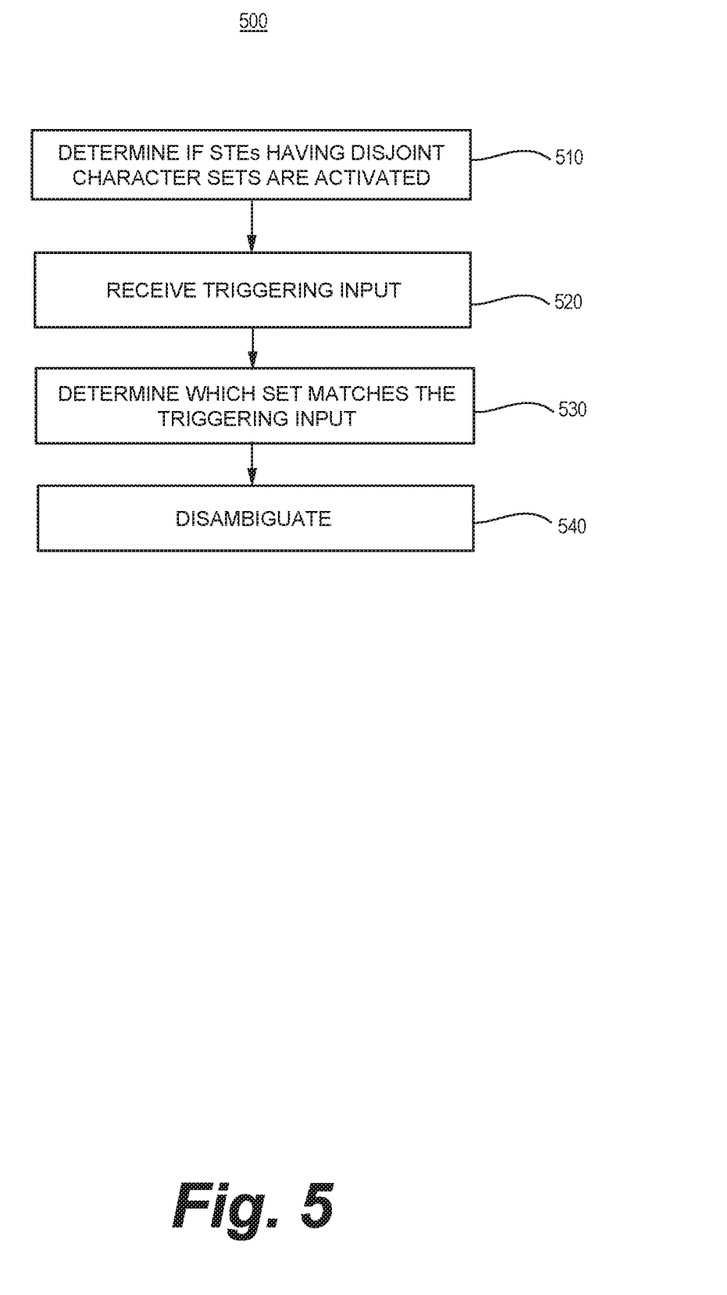
FIG. 5 is a flowchart of an exemplary method for automatically reporting disjoint character sets in an application for an automata processor.

FIG. 5 is a flowchart of an exemplary method 500 for automatically disambiguating a merged report from an application on an automata processor. Method 500 may be implemented using a traditional von Neumann processor.

"ZW305" and if the group contained a first STE having character set "XY697" and a second STE having character set "ZW305," then the group would activate and the global input ("ZW305") would be compared to the first character set ("XY697") and the second character set ("ZW305") in order to determine which character set matches the triggering input.

At step 540, the processor may disambiguate the report based on the set matching the triggering input. For example, if the triggering input contained "ZW305" and was compared to a first character set "XY697" and a second character set "ZW305," then a report generated by a group having a first STE with character set "XY697" and a second STE with character set "ZW305" could be disambiguated.

EXAMPLE

Multiple simulations were developed and run in order to demonstrate potential efficiency gains by using the disclosed methods for automatically optimizing a reporting architecture of an application. The simulation used the disclosed methods as described in the example pseudocode below:

```
input    :set E of element objects representing an NFA
input    :set R ⊆ E of reporting STE element objects
input    :function Parents returns input connections to given element
input    :function Children returns output connections from given element
input    :function Matches returns char set of matching input stimuli for an STE element
output   :An NFA with reports merged (set of element objects)
1        foreach element r ∈ R do
2            if |Children(r)| > 0 then
3                continue
4            end
5            element sink (STE matching all input);
6            Parents(sink) ← {r};
7            E ← E ∪ {sink};
8            R ← R \ {r};
9            char set match ← Matches(r);
10           foreach element r' ∈ R do
11               if |Children(r')| > 0 then
12                   continue
13               end
14               if match ∩ Matches(r') == 0 then
15                   Parents(sink) ← Parents(sink) ∪ {r'};
16                   R ← R \ {r'};
17               end
18           end
19           R ← R ∪ {sink};
20       end
21       return E
```

50

At step 510, the processor may determine if a group of state transition elements (STEs) in the application having disjoint character sets has been activated. For example, the group of STEs may be activated by a triggering input (also termed the "global input"). The group of STEs may be described as activated because the combined Boolean result of the included matching rules is true (i.e., 1). Two character sets may be disjoint when the sets have no common members—e.g., the character set "ZW305" and the character set "XY697" are disjoint while the character set "ZW305" and the character set "XY509" are not disjoint on account of '5' and '0' being common to both sets.

At step 520, the processor may receive the triggering input. At step 530, the automata processor may determine which set of the disjoint character sets matches the triggering input. For example, if the global input contained All simulations were performed using the Virtual Automata Simulator (VASim). VASim is an open source application for simulating execution of applications on automata processors.

The optimization methods disclosed herein were tested on applications contained within the ANMLZoo automata processing benchmark suite. The reference Wadden et al., "ANMLzoo: a benchmark suite for exploring bottlenecks in automata processing engines and architectures," 2016 IEEE International Symposium on Workload Characterization, is incorporated herein by reference for its disclosure of the ANMLZoo suite.

The optimization methods disclosed herein resulted in projected efficiency gains as high as 27.17%; however, the projected efficiency was application-specific. Table 1 shows the results of this example for benchmark applications in the ANMLZoo suite. Table 3 includes the original number of reporting elements in an application, the compressed number of reporting elements in the application after applying the optimization methods disclosed herein, the factor representing the percentage by which the number of reporting elements was reduced, and the speedup representing the percentage in performance gain as predicted by FASim.

TABLE 1

| Benchmark | Original | Compressed | Factor | Speedup |
|---|---|---|---|---|
| Snort | 2,585 | 2,393 | 46.1% | 23.51% |
| Dotstar | 2,837 | 365 | 87.1% | 0% |
| ClamAV | 515 | 92 | 82.1% | 0% |
| PowerEN | 2,857 | 566 | 80.1% | 7.35% |
| Brill | 1,962 | 1,962 | 0% | N/A |
| Protomata | 2,340 | 2,340 | 0% | N/A |
| Hamming | 186 | 93 | 50% | 0% |
| Levenshtein | 96 | 28 | 70.8% | 0% |
| ER | 1000 | 1000 | 0% | N/A |
| SPM | 5,025 | 5,025 | 0% | N/A |
| Fermi | 2,399 | 71 | 97% | 27.17% |
| RF | 3,767 | 3,767 | 0% | N/A |

The foregoing description has been presented for purposes of illustration. It is not exhaustive and is not limited to precise forms or embodiments disclosed. Modifications and adaptations of the embodiments will be apparent from consideration of the specification and practice of the disclosed embodiments.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the processor, are readily within the purview of a software developer. The computer programs, program modules, or code can be created using a variety of programming techniques. For example, they can be designed in or by means of Verilog Hardware Description Language, VHSIC Hardware Description Language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for automatically optimizing automata graphs for applications on spatial reconfigurable automata processors, comprising:
   a memory storing instructions; and
   an automata processor configured to execute the instructions to:
      identify one or more state transition elements in the application;
      determine if two or more state transition elements have disjoint character sets;
      group two or more state transition elements having disjoint character sets into one or more groups;
      activate one or more state transition elements in response to a Damerau-Levenshtein distance of a global input and the one or more state transition element being less than a threshold;
      merge activation states of the state transition elements included in the one or more groups; and
      output a merged report configured for disambiguation on a second processor.

2. The system of claim 1, wherein the instructions to merge state transition elements comprise installing OR gates configured to combine two or more reports from state transition elements included in the one or more groups.

3. The system of claim 1, wherein the instructions to merge state transition elements comprise adding one or more child elements to the one or more groups configured to combine two or more reports from state transition elements included in the one or more groups.

4. The system of claim 1, wherein the instructions to merge state transition elements comprise wiring the outputs of at least one group of the one or more groups to a single report port of the automata processor.

5. The system of claim 1, wherein the automata processor comprises one or more field-programmable gate arrays.

6. The system of claim 1, wherein the automata processor comprises a Micron Automata Processor.

7. A method for automatically optimizing automata graphs for applications on a spatial reconfigurable automata processor, comprising:
   identifying one or more state transition elements in the application;
   determining if two or more state transition elements have disjoint character sets;
   grouping two or more state transition elements having disjoint character sets into one or more groups;
   activating one or more state transition elements in response to a Jaccard index of a global input and the one or more state transition element exceeding a threshold;
   merging activation states of the state transition elements included in one or more groups; and
   outputting a merged report configured for disambiguation on a second processor.

8. The method of claim 7, wherein merging state transition elements comprises installing OR gates configured to combine two or more reports from state transition elements included in the one or more groups.

9. The method of claim 7, wherein merging state transition elements comprises adding one or more child elements to the one or more groups configured to combine two or more reports from state transition elements included in the one or more groups.

10. The system of claim 1, wherein merging state transition elements comprises wiring the outputs of at least one group of the one or more groups to a single report port of the automata processor.

11. A method for automatically disambiguating a merged report from an application on automata processor, comprising:
- determining if a group of state transition elements in the application having disjoint character sets has been activated by a triggering input based on a comparison between a threshold and a Damerau-Levenshtein distance of a global input and at least one state transition element of the group;
- receiving the triggering input;
- determining which set of the disjoint character sets matches the triggering input; and
- disambiguating the report based on the set matching the triggering input.

* * * * *